(12) United States Patent
Sin

(10) Patent No.: US 9,178,967 B2
(45) Date of Patent: Nov. 3, 2015

(54) HART ANALOG INPUT MODULE WITH DIFFERENTIAL INPUT STAGE

(71) Applicant: LSIS CO., LTD., Anyang-si, Gyeonggi-do (KR)

(72) Inventor: Yonggak Sin, Anyang-si (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 155 days.

(21) Appl. No.: 13/953,537

(22) Filed: Jul. 29, 2013

(65) Prior Publication Data

US 2014/0044136 A1  Feb. 13, 2014

(30) Foreign Application Priority Data

Aug. 10, 2012  (KR) .................. 10-2012-0087621

(51) Int. Cl.
*G06F 13/00*  (2006.01)
*H04L 27/00*  (2006.01)
*H04L 29/06*  (2006.01)
*G05B 19/05*  (2006.01)

(52) U.S. Cl.
CPC .............. *H04L 69/08* (2013.01); *G05B 19/054* (2013.01); *G05B 2219/1163* (2013.01)

(58) Field of Classification Search
CPC ....................... H04L 67/28; G05B 2219/25428
See application file for complete search history.

(56) References Cited

U.S. PATENT DOCUMENTS

2002/0154860 A1*  10/2002  Fernald et al. ................. 385/37
2003/0023795 A1*  1/2003  Packwood et al. ............ 710/105
2009/0138104 A1*  5/2009  Huck ............................... 700/75
2012/0004741 A1*  1/2012  Suzuki ............................ 700/12
2012/0236768 A1*  9/2012  Kolavennu et al. ........... 370/310
2012/0278042 A1*  11/2012  Matzen .......................... 702/183
2013/0069792 A1*  3/2013  Blevins et al. ............. 340/815.4
2013/0188752 A1*  7/2013  Sin ................................. 375/299

FOREIGN PATENT DOCUMENTS

CN  1530800  9/2004
CN  101113934  1/2008

(Continued)

OTHER PUBLICATIONS

The State Intellectual Property Office of the People's Republic of China Application Serial No. 201310347544.0, Office Action dated Jun. 17, 2015, 6 pages.

*Primary Examiner* — Hyun Nam
(74) *Attorney, Agent, or Firm* — Lee, Hong, Degerman, Kang & Waimey

(57) ABSTRACT

A HART analog input module with a differential input comprises a plurality of input stage processors respectively connected to a plurality of HART field devices to detect a DC signal and a HART communication signal from an input signal and output the DC signal and a HART communication signal, in a case a signal superimposed with the DC signal and the HART communication signal is inputted from a relevant HART field device, a multiplexer sequentially outputting a DC signal and a HART communication signal respectively outputted from each input stage processor in response to a provided control signal, an A/D conversion processor converting a DC signal of each channel sequentially outputted from the multiplexer to a digital signal, a HART modem demodulating a HART communication signal of each channel sequentially outputted from the multiplexer, and a controller providing a control signal to the multiplexer and processing the digital signal outputted from the A/D conversion processor and the HART modem.

10 Claims, 5 Drawing Sheets

(56) References Cited

FOREIGN PATENT DOCUMENTS

| CN | 201514244 | 6/2010 |
| CN | 201514245 | 6/2010 |
| CN | 101893868 | 11/2010 |
| CN | 102032928 | 4/2011 |
| CN | 102213953 | 10/2011 |
| CN | 102334077 | 1/2012 |
| CN | 102340137 | 2/2012 |
| CN | 102368152 | 3/2012 |
| CN | 102538904 | 7/2012 |

* cited by examiner

HART ANALOG INPUT MODULE WITH DIFFERENTIAL INPUT STAGE

CROSS-REFERENCE TO RELATED APPLICATION

Pursuant to 35 U.S.C. §119 (a), this application claims the benefit of earlier filing date and right of priority to Korean Application Number 10-2012-0087621, filed on Aug. 10, 2012, the contents of which are hereby incorporated by reference in their entirety.

BACKGROUND OF THE INVENTION

1. Field of the Invention

Exemplary embodiments of the present disclosure relate to a HART analog input module with a differential input stage, and more particularly to a HART analog input module with a differential input stage configured to efficiently perform a HART communication while maintaining a differential structure improved in noise characteristics relative to an analog signal.

2. Description of Related Art

An analog input module is widely used at industrial sites including food packing machines, various industrial furnaces, semiconductor manufacturing devices and plastic forming machines, and concomitant with increased demands on high performance, intelligent transmitters and effective management thereon, a communication function between the transmitter and PLCs (Programmable Logic Controllers) is required of late.

The PLC is a general-purpose control device configured to enable a program control by replacing the relay, timer and counter functions of the conventional control panel with a semiconductor device including integrated circuits and transistors, and by adding an operation function to a basic sequential control function.

A current communication method widely adopted by a transmitter complies with HART (Highway Addressable Remote Transducer) communication protocol. Generally speaking, the HART communication protocol supports a combined digital and analog signal on a dedicated wire or set of wires, in which on-line process signals (such as control signals, sensor measurements, etc.) are provided as an analog current signal (e.g., ranging from 4 mA~20 mA), and has an excellent improvement effect in information use and management of 2-wire type instruments.

The HART communication protocol supports an output of a measurement value (process variable) measured in an analog signal and added information to a digital signal. The HART communication protocol supports setting-up of various parameters, calibrates a transmitter at a remote area, and even performs fault diagnosis, whereby a field situation can be three-dimensionally monitored from a control room with ample information related to operation of field instruments.

Use of the rapidly developed PLC has gradually expanded into an area of distributed control system of late, and as a result, the HART communication function largely used in the distributed control system is also required in the PLC.

The HART protocol makes use of the FSK (Frequency Shift Keying) standard to superimpose the digital signals at a low level on top of the 4 mA-20 mA analog signals. The HART protocol communicates at 1200 bps without interrupting the 4 mA~20 mA signals and allows a host application (master) to get two or more digital updates per second from a field device. As the digital FSK signal is phase continuous, and an average value of the HART communication signal is zero, there is no interference with the 4-20 mA analog signals.

Meanwhile, in a case an analog input module used in industrial instrument such as the PLC is connected to various HART field instruments, the product must be equipped with a function of converting an analog signal to a digital signal and a function of performing the HART communication with HART field instruments as well.

Creation and interpretation of a HART communication signal by an analog input module is carried out through a HART modem. In order to normally implement the function, a ground potential of the HART communication signal must be continuously maintained until transmitted from an input terminal of the analog input module to the HART modem.

Although a single-ended type input terminal provides a structure required for this condition, a problem of disrupting an insulation state among channels and a problem of abandoning a differential structure excellent in noise characteristic come to the surface. That is, in order to allow the HART modem to normally recognize a detected HART communication signal, potentials of the HART communication signal must be identical at each element processing the HART communication signal, and a single-ended configuration used for this purpose means that grounds of each HART field device connected to an analog input module are common.

For example, grounds of several HART field devices respectively connected to each channel are all commonly connected to a ground of the analog input module to allow operating on a same ground potential. This means that, in a case a defect occurs on any one of the grounds in the HART field devices, the defect may be transmitted to a ground of a structurally-different HART field device and to a ground of an analog input module.

Furthermore, as is known, a single-ended signal input circuit cannot remove a common mode noise, such that a path of a commonly-grounded circuit into which the common mode noise is introduced increases in proportion with the channels.

As one of the methods structurally solving the abovementioned problems, although each channel may be configured to have an individual signal processing circuit, the number of signal processing components is required as many as the number of channels to disadvantageously increase the manufacturing cost.

SUMMARY OF THE INVENTION

Exemplary aspects of the present disclosure are to substantially solve at least the above problems and/or disadvantages and to provide at least the advantages as mentioned below. Thus, the present disclosure is directed to provide a HART analog input module with a differential input stage configured to maintain single-ended configuration required for processing a HART communication signal, by using and processing a plurality of channel signals with a common component.

Another object of the present disclosure is to provide a HART analog input module with a differential input stage configured to efficiently operate a HART communication by differentially configuring an input stage of an analog input module and preventing ground abnormalcy of a HART field device connected to each channel from influencing other channels.

In one general aspect of the present disclosure, there is provided a HART analog input module with a differential input stage, the HART analog input module comprising: a plurality of input stage processors respectively connected to a plurality of HART field devices to detect a DC signal and a HART communication signal from an input signal and output the DC signal and a HART communication signal, in a case a signal superimposed with the DC signal and the HART communication signal is inputted from a relevant HART field device;

a multiplexer sequentially outputting a DC signal and a HART communication signal respectively outputted from each input stage processor in response to a provided control signal;

an A/D conversion processor converting a DC signal of each channel sequentially outputted from the multiplexer to a digital signal;

a HART modem demodulating a HART communication signal of each channel sequentially outputted from the multiplexer; and a controller providing a control signal to the multiplexer and processing the digital signal outputted from the A/D conversion processor and the HART modem.

Preferably, but not necessarily, the multiplexer may include an analog multiplexer configured to sequentially output the DC signal of each channel outputted from each input stage processor to the A/D conversion processor in response to the control signal provided by the controller, and a HART multiplexer configured to sequentially output a HART communication signal of each channel outputted from the each input stage processor to the HART modem in response to the control signal provided from the controller.

Preferably, but not necessarily, the each input stage processor may include an insulation ground terminal configured to output a DC signal as a differential signal to allow a ground potential used for recognition of a self-outputted HART communication signal to be equal to a ground potential of a relevant HART field device.

Preferably, but not necessarily, the HART multiplexer may use a ground potential of an insulation ground terminal corresponding to a relevant input stage processor, in a case a currently-ordered HART communication signal is recognized.

Preferably, but not necessarily, the input stage processor may include a current detection resistor configured to detect a current signal inputted from a relevant HART field device, an insulation capacitor and an insulation resistor connected in series between the current detection resistor and a ground of the HART analog input module, a HART communication signal detection capacitor configured to detect a HART communication signal from the current signal inputted from the relevant HART field device, and a first conditioning resistor and a second conditioning resistor configured to be respectively connected between both ends of the current detection resistor and the HART analog input module for adjustment and output of a differential signal, wherein the insulation ground terminal is a contact point between the insulation capacitor and the insulation resistor.

Preferably, but not necessarily, the HART multiplexer may include a plurality of signal input stages configured to respectively receive the HART communication signal outputted from each input stage processor, and a plurality of ground terminals configured to be respectively connected to the insulation ground terminals of each input stage processor.

Preferably, but not necessarily, the HART multiplexer may be configured to selectively output a HART communication signal applied between a particular signal input stage in the plurality of signal input stages and a particular ground terminal in the plurality of ground terminals.

Preferably, but not necessarily, a currently-selected ground terminal of the HART multiplexer may be configured to be connected to a common ground used for recognizing a HART communication signal.

Preferably, but not necessarily, the A/D conversion processor may include a differential amplifier and an A/D converter, wherein the differential amplifier increases an input impedance of the A/D converter viewed from the analog multiplexer, and decreases an impedance of the analog multiplexer viewed from the A/D converter.

Preferably, but not necessarily, the insulation resistor may have a resistor value greater by 100 times than the current detection resistor.

The HART analog input module with a differential input stage according to an exemplary embodiment of the present disclosure has an advantageous effect in that an analog signal process of the HART analog input module is automatically carried out to prevent a common mode noise from affecting an analog signal.

Another advantageous effect is that an insulation characteristic can be obtained as used with A/D converters and HART modems as many as the number of channels, even with a single A/D converter and HART modem, and an error generated on a ground potential of a HART field device connected to each channel can be prevented from affecting on other channels.

Still another advantageous effect is that a single ended configuration for HART communication and a differential type structure for improving noise characteristic in an analog signal can be simultaneously accomplished to operate a highly reliable measurement and HART communication with a reduced cost.

DETAILED DESCRIPTION OF THE INVENTION

Now, a HART analog input module with a differential input stage according to the present disclosure according to exemplary embodiments of the present disclosure will be described in detail with reference to the accompanying drawings.

Figure 1:
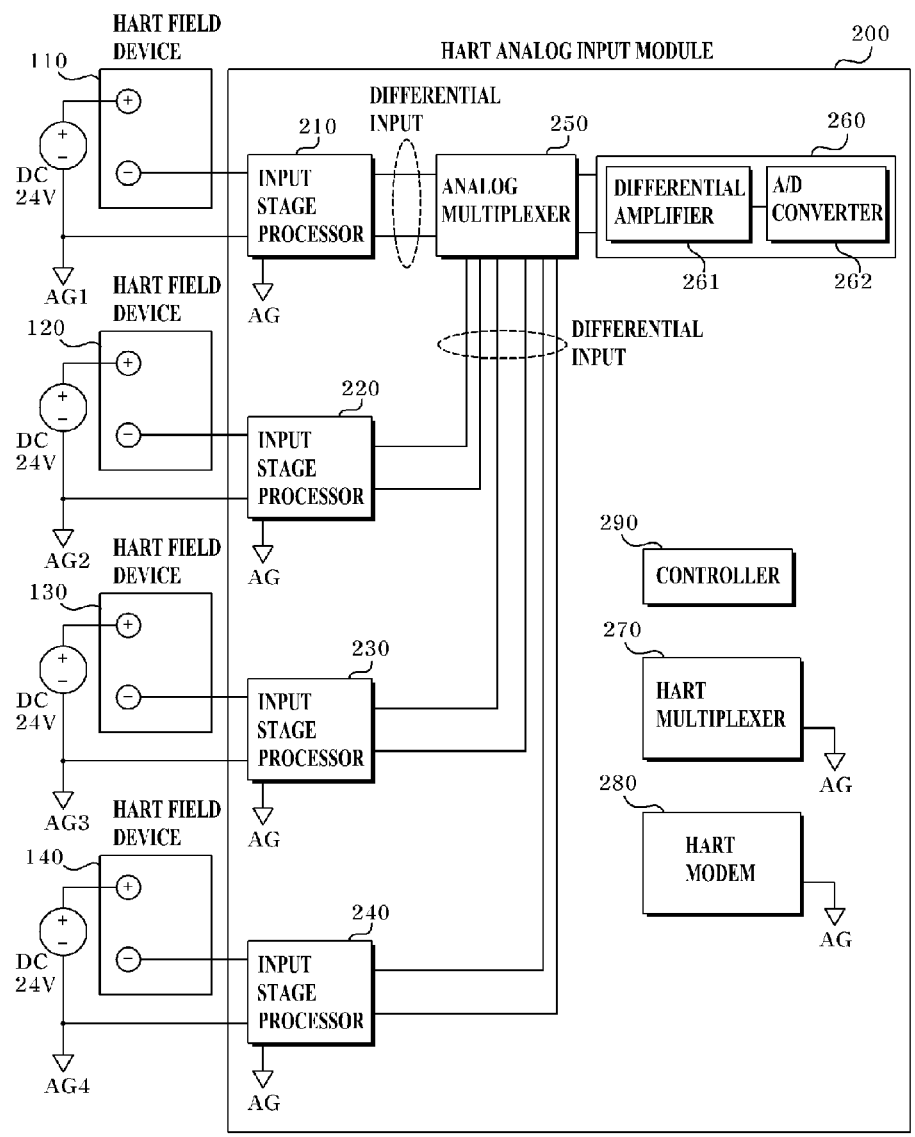
FIG. 1 is a block diagram illustrating a HART analog input module with a differential input stage according to the present disclosure.

FIG. 1 is a block diagram illustrating a HART analog input module with a differential input stage according to the present disclosure.

Referring to FIG. 1, a HART analog input module (200) according to the present disclosure is connected to a plurality of HART field devices (110, 120, 130, 140) and may include a plurality of input stage processors (210, 220, 230, 240), an analog multiplexer (250), an A/D conversion processor (260), a HART multiplexer (270), a HART modem (280) and a controller (290). Although FIG. 1 has illustrated an example having four channels, the present disclosure is not limited thereto. The number of channels may be variably configured, if necessary.

Each of the plurality of HART field devices (110, 120, 130, 140) is connected to each of the input stage processors (210, 220, 230, 240) on one-on-one base, and each of the input stage processors (210, 220, 230, 240) receives a signal superimposed with a DC signal and a HART communication signal (modulated digital signal) from the HART field devices (110, 120, 130, 140) connected to the input stage processors (210, 220, 230, 240) to detect and output a relevant DC signal and a relevant HART communication signal. At this time, the detected DC signal is transmitted to the analog multiplexer (250), and the detected HART communication signal is outputted to the HART multiplexer (270).

Each of the HART field devices (110, 120, 130, 140) is a device having a HART communication function such as a sensor and a valve, and the signal inputted to each of the input stage processors (210, 220, 230, 240) is a HART communication signal superimposed on top of 4 mA~20 mA DC signals.

The DC signal is a value configured to indicate a measurement value such as a flux, pressure and temperature, or valve openness, and the HART communication signal is a signal modulated to 1200 Hz~2200 Hz frequency signals from digital data on a FSK (Frequency Shift Keying) standard. The HART communication signal can carry various types of information, if necessary.

Particularly, each of the input stage processors (210, 220, 230, 240) is configured to output a DC signal in a differential signal, and provides an insulation ground terminal for making a ground potential to be used by the HART analog input module (200) for recognizing a HART communication signal equal to a ground potential of the HART field devices (110, 120, 130, 140) connected to relevant input stage processors (210, 220, 230, 240).

For example, in a case a HART communication signal detected and outputted by the input stage processor (210) is processed, all components of the HART analog input module (200) that must recognize HART communication signals of the HART multiplexer (270) and the HART modem (280) use a potential of an insulation ground terminal of the input stage processor (210) as a ground potential.

The analog multiplexer (250) receives a DC signal outputted from each of the input stage processors (210, 220, 230, 240) to sequentially output the DC signal in response to a control signal provided by the controller (290), and performs the A/D conversion processing using a single component. At this time, an input/output signal of the analog multiplexer (250) is a differential signal.

The A/D conversion processor (260) converts a DC signal sequentially outputted from the analog multiplexer (250) to a digital signal, where the A/D conversion processor (260) may include a differential amplifier (261) and an A/D converter (262). The differential amplifier (261) of the A/D conversion processor (260) functions to increase an input impedance of the A/D converter (262) viewed from the analog multiplexer (250), and to decrease an impedance of the analog multiplexer viewed from the A/D converter, where the A/D converter (262) converts a signal outputted from the differential amplifier (250) to a digital signal. The differential amplifier (261) may receive a differential signal and transmit the differential signal to the A/D converter (262) as an output of a single-ended type, and may receive a differential signal and transmit The HART multiplexer (270) receives each HART communication signal outputted from each of the input stage processors (210, 220, 230, 240) and sequentially outputs the each HART communication signal to the HART modem (280) in response to a control signal provided from the controller (290), and processes the signals by using HART communication signals inputted into several channels by a single HART modem (280), where the HART modem (280) demodulates each of the HART communication signals sequentially outputted from the HART multiplexer (270).

Particularly, the HART multiplexer (270) is configured to use a ground potential of an insulation ground terminal corresponding to relevant input state processors (210, 220, 230, 240), in a case a currently-ordered HART communication signal is recognized and outputted. That is, although the HART multiplexer (270) may be changed in configuration and shape in response to the number of channels, the HART multiplexer (270) individually uses and switches a ground potential corresponding to a relevant channel, in a case the HART communication signal of each channel is processed.

The controller (290) may be configured using a CPU (Central Processing Unit), and controls the HART analog input module (200) on the whole. Particularly, the controller (290) provides a control signal to the analog multiplexer (250) and the HART multiplexer (270) to sequentially process the DC signal and the HART communication signal inputted from various channels, and processes a digital signal outputted from the A/D conversion processor (260) and the HART modem (280).

Figure 2:
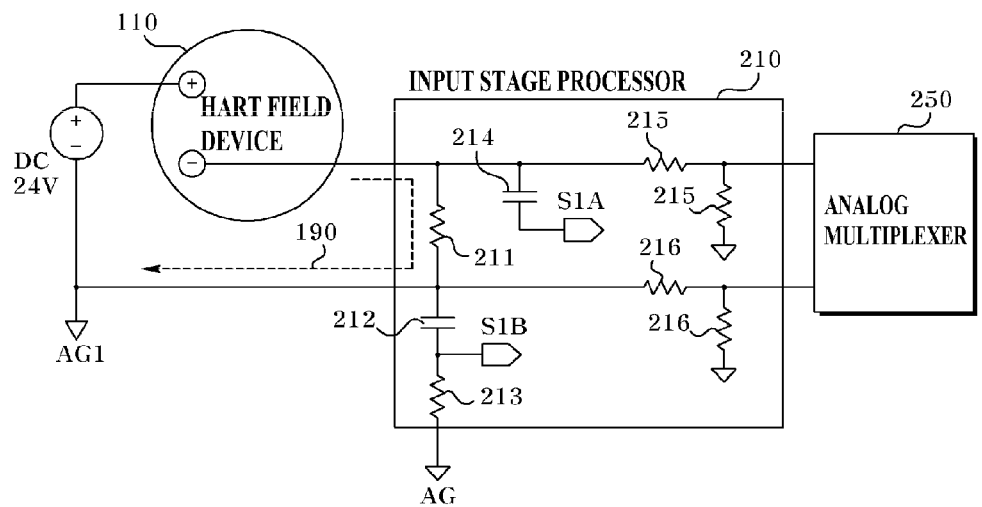
FIG. 2 is a detailed circuit diagram illustrating input stage processors of FIG. 1.

FIG. 2 is a detailed circuit diagram illustrating input stage processors (210, 220, 230, 240) of FIG. 1.

Referring to FIG. 2, the input stage processors (210, 220, 230, 240) may include a current detection resistor (211) configured to detect a current signal inputted from the HART field devices (110, 120, 130, 140) connected to the input stage processors (210, 220, 230, 240), an insulation capacitor (212) configured to operate in a single ended manner when viewed from a viewpoint of a HART communication signal, and to differentially operate in an open state when viewed from a viewpoint of a DC signal, an insulation resistor (213) configured to be connected in series between the insulation capacitor (212) and the HART analog input module (200) to form a signal loop insulated by each channel, a HART communication signal detection capacitor (214) configured to detect a HART communication signal superimposed on top of a current signal, and first/second conditioning resistors (215, 216) configured to adjust a signal of a differential structure.

The current signal inputted from the HART field devices (110, 120, 130, 140) flows to a ground (AG1) of the HART field devices (110, 120, 130, 140) through the current detection resistor (211) to form a loop current (190), where the loop current (190) is superimposed with the HART communication signal. The HART communication signal is modulated by FSK standard to express 1 and 0 via two frequencies of 1200 Hz and 2200 Hz.

An impedance of a capacitor increases as a frequency grows lower, such that only a harmonic component can pass the capacitor. In a case a DC component with a zero (0) frequency is introduced, the impedance becomes infinite to interrupt a signal, whereby only the HART communication signal, which is an AC signal, can pass the HART communication signal detection capacitor (214).

The HART communication signal detection capacitor (214) may be configured and operated by being divided in response to a reception operation and a transmission operation of the HART communication signal. For example, one may be used for HART transmission, and the other may be used for HART reception.

The insulation capacitor (212) operates in an opened state relative to 4 mA~20 mA DC signals, such that the 4 mA~20 mA DC signals may be configured in a complete differentiation. At this time, a differential signal is inputted to the analog multiplexer (250) through a contact point of the first conditioning resistor (215) and a contact point of the second conditioning resistor (216).

Furthermore, the insulation capacitor (212) is operated in a short-circuited state when viewed from a viewpoint of a HART communication signal carried in an AC signal, and a ground (AG1) of a relevant HART field device (110) and a ground (AG) of the HART analog input module (200) are in a coupled state through the insulation capacitor (212). Hence, an insulation ground terminal for allowing a potential of a common ground (AG) used for recognizing, by the HART analog input module (200), the HART communication signal to be equal to a potential of a ground (AG1) of the HART field device (110) connected to a relevant input stage processor (210) may be configured to be a contact point (S1B) between the insulation capacitor (212) and the insulation resistor (213).

At this time, a resistance value of the insulation resistor (213) is preferably configured to be greater than a resistance value of the current detection resistor (211). For example, the resistance value of the insulation resistor (213) may be configured to be 100 times greater than that of the current detection resistor (211). Now, a detailed exemplary embodiment of the HART multiplexer (270) will be described with reference to FIGS. 3 and 4.

Figure 3:
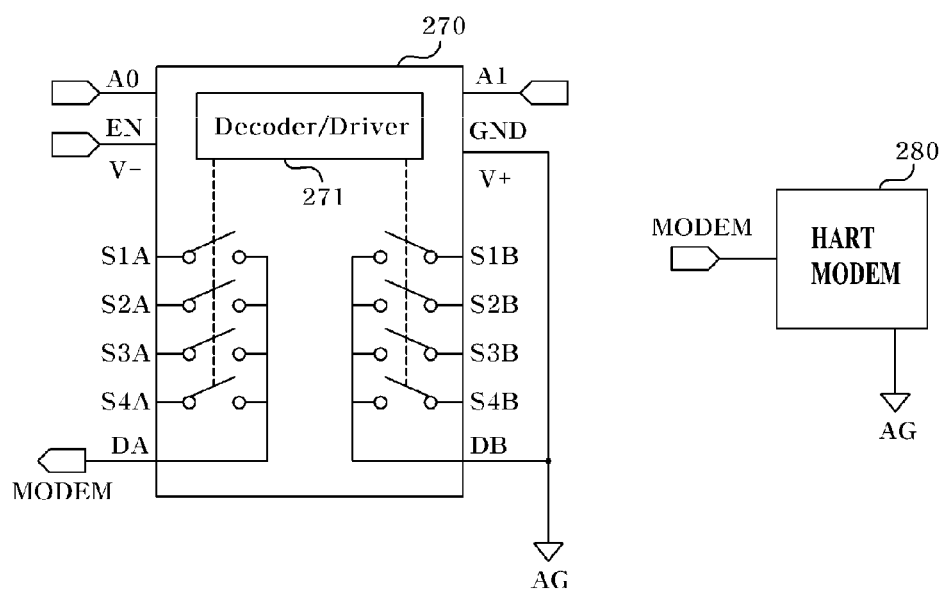
FIG. 3 is a detailed configuration illustrating a HART multiplexer of FIG. 1.
Figure 4:
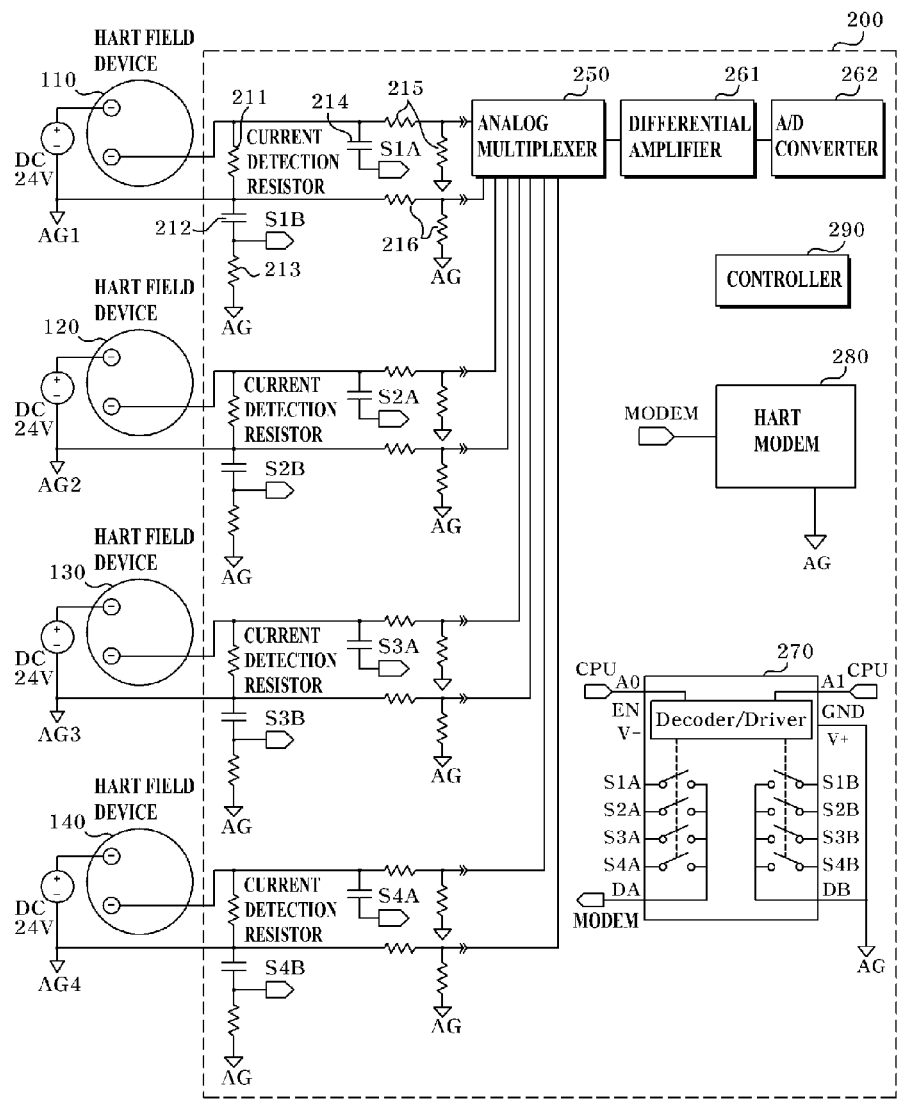
FIG. 4 is a detailed circuit diagram illustrating a HART analog input module reflected with configurations in FIGS. 2 and 3.

FIG. 3 is a detailed configuration illustrating the HART multiplexer of FIG. 1, and FIG. 4 is a detailed circuit diagram illustrating a HART analog input module reflected with configurations in FIGS. 2 and 3.

Referring to FIGS. 3 and 4, the HART multiplexer (270) includes a plurality of signal input stages configured to receive a HART communication signal of each channel by being connected to each HART communication signal output stages (S1A, A2A, S3A, S4A) of each input stage processors (210, 220, 230, 240), and a plurality of ground terminals each connected to insulation ground terminals (S1B, S2B, S3B, S4B) of each input stage processors (210, 220, 230, 240).

A control signal is inputted to an EN terminal of the HART multiplexer (270) for determining whether the HART multiplexer (270) operates, and AO and A1 terminals are inputted by a control signal for selecting channels.

A decoder and a driver (271) switches, to a signal output terminal DA, one of signal input stages in response to a control signal inputted to the AO and A1 terminals, and switches a ground terminal corresponding to a relevant signal output terminal to a ground output terminal DB of the HART multiplexer (270). At this time, the ground output terminal DB is connected to a common ground (AG), where the common ground (AG) means a ground commonly used for recognizing, by the HART analog input module (200), a HART communication signal.

The ground output terminal DB of the HART multiplexer (270) is also connected to an insulation ground terminal provided by any one of the input stage processors, and therefore, after all, the common ground (AG) has a potential equal to a ground (any one of AG1~AG4) of a HART field device corresponding to a current channel, which means that a HART communication signal of a relevant channel can be correctly recognized.

The signal output terminal DA of the HART multiplexer (270) is connected to an input of the HART modem (280), and a HART communication signal detected by the current channel is transmitted to the HART modem (280).

Figure 5:
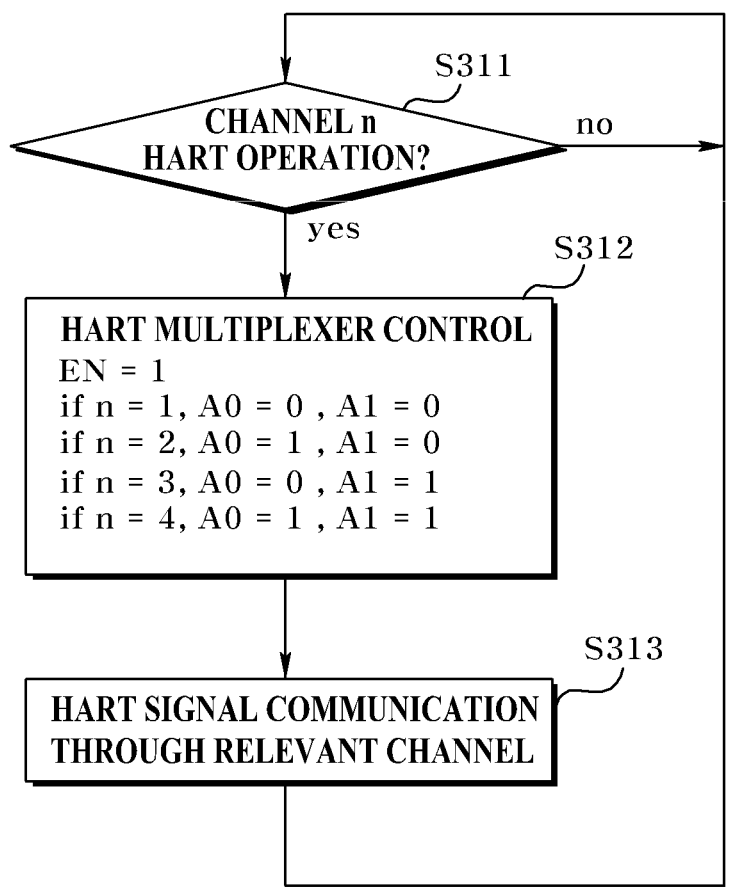
FIG. 5 is a flowchart illustrating a process configured to control a HART multiplexer by a controller illustrated in FIGS. 1 and 4.

FIG. 5 is a flowchart illustrating an example of a process configured to control a HART multiplexer by a controller (S290) illustrated in FIGS. 1 and 4, where the controller (290) controls in such a manner that HART communications are sequentially realized through channel 1, channel 2, channel 3 and channel 4 by setting EN, AO and AN values of the HART multiplexer (270). That is, the controller (29) sets the EN, AO and AN values of the HART multiplexer (270) (S312) for performing a communication through channel n which is a current order (S311).

At this time, it is assumed that EN determines whether the HART multiplexer (270) operates, and the HART multiplexer (270) operates in a case the EN is in a high state. AO and A1 determine which channel to select. For example, configuration may be made in such a manner that channel 1, channel 2, channel 3 and channel 4 are respectively selected, in a case states of AO and A1 terminals are in low-low state, high-low state, low-low state and high-low state.

Then, the HART multiplexer (270) transmits a HART signal received from a currently-selected channel to the HART modem (280), and the HART modem (280) modulates the HART signal, whereby the HART communication is realized through the currently-selected channel (S313).

Turning to FIG. 4 again, a HART communication signal is recognized between S1A and S1B, in a case the HART communication is performed through the channel 1, a HART communication signal is recognized between S2A and S2B, in a case the HART communication is performed through the channel 2, a HART communication signal is recognized between S3A and S3B, in a case the HART communication is performed through the channel 3, and a HART communication signal is recognized between S4A and S4B, in a case the HART communication is performed through the channel 4.

That is, the HART communication is selected by a ground terminal of the HART multiplexer (270) or in the order of S1B, S2B, S3B and S4B at communication order of each channel, where a ground potential of the HART multiplexer (270) is also a ground potential of the HART modem (280).

Grounds having equal potentials, in a case communication is realized through channel 1 are AG1, S1B and AG, grounds having equal potentials, in a case communication is realized through channel 2 are AG2, S2B and AG, grounds having equal potentials, in a case communication is realized through channel 3 are AG3, S3B and AG, and grounds having equal potentials, in a case communication is realized through channel 4 are AG4, S4B and AG.

As apparent from the foregoing, a HART field device sharing a ground potential is only one, in a case the HART communication is realized at an arbitrary channel to enable maintenance of insulation characteristic among channels, whereby a failure generated from any ground of a HART field device is not propagated.

Although exemplary embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:

1. A Highway Addressable Remote Transducer (HART) analog input module with a differential input stage, the HART analog input module comprising:

a plurality of input stage processors each connected to one of a plurality of HART field devices to detect a DC signal and a HART communication signal from a signal superimposed with the DC signal and the HART communication signal from the corresponding HART field device and to output the detected DC signal and HART communication signal;

a multiplexer sequentially outputting the DC signal and HART communication signal from each of the plurality of input stage processors in response to a control signal;

an A/D conversion processor converting a DC signal of each channel sequentially output from the multiplexer to a digital signal;

a HART modem demodulating a HART communication signal of each channel sequentially output from the multiplexer; and a controller providing the control signal to the multiplexer and processing the digital signal output from the A/D conversion processor and the demodulated HART communication signal output from the HART modem.

2. The HART analog input module of claim 1, wherein the multiplexer includes:

an analog multiplexer sequentially outputting the detected DC signal output from each of the plurality of input stage processors to the A/D conversion processor in response to the control; and a HART multiplexer sequentially outputting the detected HART communication signal output from each of the plurality of input stage processors to the HART modem in response to the control signal.

3. The HART analog input module of claim 1, wherein each of the plurality of input stage processors includes an insulation ground terminal outputting the detected DC signal as a differential signal such that a ground potential used for recognition of a self-output HART communication signal is the same as a ground potential of the corresponding HART field device.

4. The HART analog input module of claim 2, wherein the HART multiplexer uses a ground potential of an insulation ground terminal of a corresponding input stage processor in order to recognize a currently-ordered HART communication signal.

5. The HART analog input module of claim 3, wherein each of the plurality of input stage processors includes:

a current detection resistor detecting a current signal input from the corresponding HART field device;

an insulation capacitor and an insulation resistor connected in series between the current detection resistor and a ground of the HART analog input module;

a HART communication signal detection capacitor detecting the HART communication signal from the current signal input from the corresponding HART field device; and a first conditioning resistor and a second conditioning resistor connected between both ends of the current detection resistor and the HART analog input module for adjustment and output of a differential signal, wherein the corresponding insulation ground terminal is a contact point between the insulation capacitor and the insulation resistor.

6. The HART analog input module of claim 4, wherein the HART multiplexer includes:

a plurality of signal input stages receiving the HART communication signal output from each of the plurality of input stage processors; and a plurality of ground terminals connected to the insulation ground terminal of each of the plurality of input stage processors.

7. The HART analog input module of claim 6, wherein the HART multiplexer selectively outputs a HART communication signal applied between a specific signal input stage in each of the plurality of signal input stages and a particular ground terminal of the plurality of ground terminals.

8. The HART analog input module of claim 7, wherein a currently-selected ground terminal of the HART multiplexer is connected to a common ground used for recognizing a HART communication signal.

9. The HART analog input module of claim 1, wherein:

the A/D conversion processor includes a differential amplifier and an A/D converter; and the differential amplifier increases an input impedance of the A/D converter with respect to the multiplexer and decreases an impedance of the multiplexer with respect to the A/D converter.

10. The HART analog input module of claim 5, wherein the insulation resistor of each of the plurality of input stage processors has a value 100 times greater than the corresponding current detection resistor.

* * * * *